(12) United States Patent
Wang et al.

(10) Patent No.: US 11,886,793 B2
(45) Date of Patent: Jan. 30, 2024

(54) TEXTUAL DESIGN AGENT

(71) Applicant: ADOBE INC., San Jose, CA (US)

(72) Inventors: Zhaowen Wang, San Jose, CA (US); Saeid Motiian, San Francisco, CA (US); Baldo Faieta, San Francisco, CA (US); Zegi Gu, San Jose, CA (US); Peter Evan O'Donovan, Seattle, WA (US); Alex Filipkowski, San Francisco, CA (US); Jose Ignacio Echevarria Vallespi, South San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/466,679

(22) Filed: Sep. 3, 2021

(65) Prior Publication Data

US 2023/0070390 A1     Mar. 9, 2023

(51) Int. Cl.
*G06F 40/109* (2020.01)
*G06F 40/166* (2020.01)
*G06F 40/106* (2020.01)
*G06F 40/103* (2020.01)

(52) U.S. Cl.
CPC .......... *G06F 40/109* (2020.01); *G06F 40/103* (2020.01); *G06F 40/106* (2020.01); *G06F 40/166* (2020.01)

(58) Field of Classification Search
CPC .... G06F 40/109; G06F 40/103; G06F 40/106; G06F 40/166
See application file for complete search history.

(56) References Cited

U.S. PATENT DOCUMENTS

| | | | | |
|---|---|---|---|---|
| 6,711,291 | B1 * | 3/2004 | Stubler | G06T 11/60 |
| | | | | 358/453 |
| 8,416,255 | B1 * | 4/2013 | Gilra | G01J 3/526 |
| | | | | 715/810 |
| 10,109,092 | B1 * | 10/2018 | Hitchings, Jr. | G06T 11/60 |
| 10,115,215 | B2 * | 10/2018 | Matteson | G06V 30/245 |
| 10,503,972 | B2 * | 12/2019 | Reihl | G06F 40/106 |
| 10,528,649 | B2 * | 1/2020 | Wang | G06F 40/109 |
| 10,585,936 | B2 * | 3/2020 | Kraft | G06T 7/90 |

(Continued)

FOREIGN PATENT DOCUMENTS

| | | | | |
|---|---|---|---|---|
| GB | 2578988 A | * | 6/2020 | G06T 11/60 |
| WO | WO-2021246642 A1 | * | 12/2021 | |

*Primary Examiner* — Benjamin Smith
(74) *Attorney, Agent, or Firm* — Shook, Hardy & Bacon L.L.P.

(57) ABSTRACT

Embodiments of the technology described herein, are an intelligent system that aims to expedite a text design process by providing text design predictions interactively. The system works with a typical text design scenario comprising a background image and one or more text strings as input. In the design scenario, the text string is to be placed on top of the background. The textual design agent may include a location recommendation model that recommends a location on the background image to place the text. The textual design agent may also include a font recommendation model, a size recommendation model, and a color recommendation model. The output of these four models may be combined to generate draft designs that are evaluated as a whole (combination of color, font, and size) for the best designs. The top designs may be output to the user.

20 Claims, 10 Drawing Sheets

(56) References Cited

U.S. PATENT DOCUMENTS

| | | | | |
|---|---|---|---|---|
| 10,664,999 | B2* | 5/2020 | Gupta | G06N 3/0454 |
| 10,803,231 | B1* | 10/2020 | Wang | G06F 40/109 |
| 10,878,298 | B2* | 12/2020 | Wang | G06F 16/90335 |
| 11,003,831 | B2* | 5/2021 | Wang | G06F 9/453 |
| 11,017,222 | B2* | 5/2021 | Reihl | G06F 40/284 |
| 11,106,870 | B2* | 8/2021 | Jankowski | G06N 7/005 |
| 11,244,207 | B2* | 2/2022 | Wang | G06F 16/90335 |
| 11,600,031 | B2* | 3/2023 | Ozeki | G06V 30/245 |
| 2016/0307347 | A1* | 10/2016 | Matteson | G06K 9/6215 |
| 2016/0314377 | A1* | 10/2016 | Vieira | G06V 30/245 |
| 2016/0358592 | A1* | 12/2016 | Rogoyski | G09G 5/026 |
| 2017/0032553 | A1* | 2/2017 | O'Donovan | G06K 9/6271 |
| 2017/0083511 | A1* | 3/2017 | Hartrell | G06N 3/084 |
| 2018/0357231 | A1* | 12/2018 | Kraft | G06F 16/5838 |
| 2019/0108203 | A1* | 4/2019 | Wang | G06V 10/82 |
| 2019/0213408 | A1* | 7/2019 | Cali | G06V 30/245 |
| 2019/0251707 | A1* | 8/2019 | Gupta | G06T 9/002 |
| 2019/0272417 | A1* | 9/2019 | Reihl | G06V 20/62 |
| 2019/0272418 | A1* | 9/2019 | Reihl | G06F 40/106 |
| 2019/0272419 | A1* | 9/2019 | Reihl | G06V 30/416 |
| 2020/0065575 | A1* | 2/2020 | Reihl | G06V 10/82 |
| 2020/0073936 | A1* | 3/2020 | Jankowski | G06F 40/30 |
| 2020/0285916 | A1* | 9/2020 | Wang | G06V 10/40 |
| 2020/0311186 | A1* | 10/2020 | Wang | G06K 9/6257 |
| 2021/0027053 | A1* | 1/2021 | Reihl | G06V 30/414 |
| 2021/0089707 | A1* | 3/2021 | Katz | H04L 51/42 |
| 2021/0103632 | A1* | 4/2021 | Kadia | G06F 40/117 |
| 2021/0103783 | A1* | 4/2021 | Wang | G06F 16/5846 |
| 2021/0141464 | A1* | 5/2021 | Jain | G06F 3/0236 |
| 2021/0201548 | A1* | 7/2021 | Ozeki | G06F 18/22 |
| 2021/0216576 | A1* | 7/2021 | Staub | G06F 16/3346 |
| 2023/0042221 | A1* | 2/2023 | Xu | G06N 3/084 |

* cited by examiner

TEXTUAL DESIGN AGENT

BACKGROUND

Setting text format and style is an important design consideration when creating posters, magazine covers, resumes, or other electronic documents. As there are a large number of available options of font faces, colors, positions and sizes, a designer may use a considerable amount of time to decide which options to use for each text instance. Currently available design prediction engines generate draft designs by matching pre-defined templates with a user's contents using heuristic rules. However, given the highly subjective nature of design choice and unbalanced data distribution, it remains challenging to build machine-learning models to provide relevant, diverse, and personalized text designs.

SUMMARY

Embodiments of the technology described herein include an intelligent system that aims to expedite a text design process by providing text designs that are relevant, diverse, and personalized. The system works with a typical text design scenario where one or more text strings are to be placed on top of the background. At a high level, the technology described herein generates different designs for a user to consider. The designs show the text strings on the background image with appropriate locations, size, color, and font faces so that the design has an appearance consistent with designs produced by skilled designers. Accordingly, the textual design agent can recommend text design options to help a designer achieve a better result.

In order to achieve diverse and relevant designs, the design process can be performed by specialized components that are each trained to select individual design characteristics, such as text location, text color, and text font. In some cases, the textual design agent may include a location recommendation model that recommends a location on the background image to place the text. The textual design agent may also include a font recommendation model, a size recommendation model, and a color recommendation model. The output of these four models may be combined to generate draft designs that are evaluated as a whole (combination of color, font, and size) for the best designs. The top designs may be output to the user.

DETAILED DESCRIPTION

Overview

Figure 1:
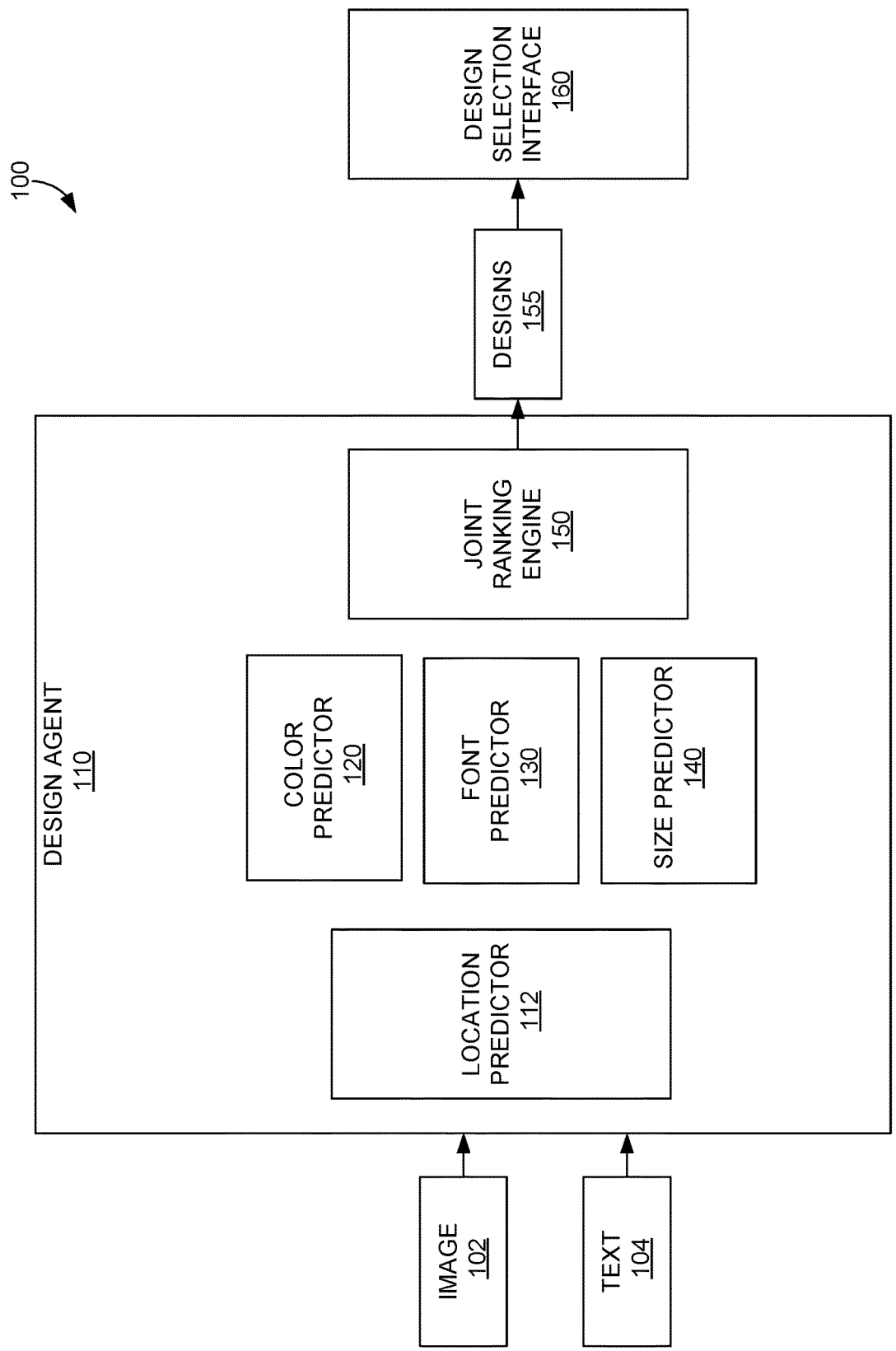
FIG. 1 provides a block diagram of a textual design system, in which embodiments described herein may be employed.

Embodiments of the technology described herein include an intelligent system that aims to expedite a text design process by providing text designs that are relevant, diverse, and personalized. The system works with a typical text design scenario where one or more text strings are to be placed on top of a background image. Existing recommendation systems often make suggestions based on frequency of past usage by a user or group of users. For example, an existing system might recommend the mostly common used fonts and font sizes. These recommendations are not based on characteristics of the background on which the text is to be placed. Recommendations based on usage often lack diversity and, therefore, lack creativity. Essentially, existing systems tend to recommend the most popular fonts and font types in all situations. Further, aspects of the recommendation, such as where to input the text on the background, may be absent in existing systems.

The technology described herein produces a more relevant text design by breaking the design process down into constituent steps. A different specialized machine-learning process is used to generate recommendations for each text characteristic (e.g., font, size, color, and location). However, a design is more than the sum of its parts. Thus, the individual text characteristics may be combined into a draft design with the text inserted at a recommended location, in a recommend color, font, and font size and then evaluated as a whole design by a machine-learning process designed to differentiate between good and bad designs. The highest ranked designs may be suggested to the user for selection or alteration.

The textual design agent may receive a background image as input along with text the user wishes to place on the background image. The textual design agent may include a location recommendation model that recommends a location on the background image to place the text. The textual design agent may also include a font recommendation model, a size recommendation model, and a color recommendation model. The output of these four models may be combined to generate draft designs that are evaluated as a whole (combination of color, font, and size) for the best designs.

The location recommendation model may be a machine-learning model based on a convolutional neural network, or some other machine learning technology. The location recommendation model may be trained using designs including existing text. In one aspect, training data is generated by removing one portion of the existing text (e.g., a word, phrase, or sentence) from a professionally produced design while the other portions remain. The location recommendation model is trained to generate a recommended location corresponding to a location of the removed text. Once trained, the location recommendation model outputs a recommended location that may be used as input by other system components to select a recommended color or other text feature.

The textual design agent may also include a color recommendation model. The color recommendation model may receive the recommended location as an input along with the background image. The color recommendation model recommends a color for the text that contrasts with the colors in the background image at the recommended location, such that the text will be visible over the background colors. The recommended color should also be compatible with the other colors in the background image.

The textual design agent may also include a font recommendation model. The font recommendation model may receive the background image as input and generate a font recommendation that corresponds with features (e.g. shapes) of the background image. In one aspect, the recommendation model is trained with designs with labeled fonts on background images. The recommendation model learns to recommend fonts similar to those in the training data given a background image. Once trained, the font recommendation model outputs one or more recommended fonts.

In some implementations, fonts on the user device may not be in the training data, which would cause these fonts not to be recommended. To rectify this situation, a visual similarity measure may be generated between excluded fonts (fonts available on a user device that are not in the training data) and fonts in the training data. The similarity measure may be used in combination with the raw recommendation score assigned to a corresponding font to generate a final recommendation score for the font. In this way, fonts available to a user may be associated with a recommendation score even when the font is not in the training data.

The textual design agent may also include a font-size recommendation model. The font-size recommendation model may receive the background image and the size (e.g. amount of characters) of the text to be added to the image as inputs. The font-size recommendation model is trained to recommend a font size using training data that includes background images with existing text. The existing text is labeled with a font size in the training data.

The recommended location, top recommended colors, top recommended sizes, and top recommended fonts are combined to generate draft textual designs. The draft textual designs are then ranked and the top ranked designs are output to the user for selection and/or modification.

System

FIG. 1 illustrates an example textual design environment 100 in which methods of the present disclosure may be employed. The textual design environment 100 includes an image 102, a text 104 to be added to the image, a design agent 110, a location predictor 112, a color predictor 120, a font predictor 130, a size predictor 140, a joint-ranking engine 150, designs 155, and a design selection interface 160.

It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions are carried out by a processor executing instructions stored in memory.

Moreover, these components, functions performed by these components, or services carried out by these components are implemented at appropriate abstraction layer(s), such as the operating system layer, application layer, hardware layer, etc., of the computing system(s). Alternatively, or in addition, the functionality of these components and/or the embodiments of the technology described herein are performed, at least in part, by one or more hardware logic components. For example, and without limitation, illustrative types of hardware logic components include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein regarding specific components shown in example environment 100, it is contemplated that in some embodiments functionality of these components are shared or distributed across other components.

Through not shown, a user device is any type of computing device capable of use by a user. The technology described herein may operate completely, or in part, on a user device. In one embodiment, the textual design interface is output through a user device. In another embodiment, the textual design interface is rendered by a user device and then output through a connected display device. Inputs received through the textual design interface may be communicated over a network to a remote computing device that generates draft designs. For example, in one embodiment, a user device is of the type of computing device described in relation to FIG. 10 herein. In various embodiments, a user device is a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

The image 102 may be in a variety of digital file formats, such as APNG (Animated Portable Network Graphics), BMP (Bitmap file), JPEG (Joint Photographic Experts Group image), PNG (Portable Network Graphics), TIFF (Tagged Image File Format), and the like. The image may include a background image. The image may contain a variety of different colors and depict a variety of content. The image may also include text.

The text 104 to be added to the image may be received from a user through a text box or other user interface. The text may be a string of characters, numbers, and symbols. The text may include one or more words, phrases, and or sentences. The text may be in any language.

The design agent 110 receives the image 102 and the text 104 that is to be added to the image. The output of the design agent 110 is one or more recommended designs for evaluation, selection, and potential modification by the user. The recommended designs 155 may be output through a user interface to the user. The recommended designs locate the text 104 on the image 102 and may include a font, color, and font size to the text. When multiple recommendations are generated, the design agent 110 may take steps to make sure the recommended designs have different appearances from each other. This prevents the system from recommending several designs that are only slight variations from each other and gives the user different options to consider.

The location predictor 112 recommends a location for the text to be placed on the image. The recommended location may take the form of a bounding box. At a high level, the location predictor 112 takes the current canvas as input and predicts a heat map indicating the likelihood of each pixel on the canvas being a candidate text location. The heat map is generated using a machine-learning model trained to recommend a location for the text. The training data for the machine-learning model may be a series of background images with a labeled location for text to be inserted. Conceptually, the "hot" areas of the heat map represent areas where the recommended insertion locations were in the training data, given a similar background. In an aspect, the location with the maximum heat map value is used as the center of the predicted text bounding box. The size of the bounding box may be determined by finding the largest rectangle area with average heat map values above a threshold. In one embodiment, the size of the bounding box may be determined such that the bounding box extends over, thus overlapping, part of the aforementioned rectangular area.

The location predictor 112 allows for user personalization. As the placement of the text is subjective and multiple reasonable locations may exist, the design selection interface 160 may allow the user to indicate a rough position for the text to be added. Using the heat map, the location predictor 112 may then select the "hottest" pixel near the location indicated by the user. The "hottest" pixel may be a pixel with the highest value within a threshold distance from the indicated location. The hottest pixel may then serve as the center of a recommended location. The location predictor 112 is described in more detail with reference to FIG. 2.

The color predictor 120 generates recommended colors for the text 104 based on colors in the image 102 and a recommended location for the text. The recommended location may be received from the location predictor 112. The recommended colors are communicated to the joint-ranking engine 150. The color predictor 120 is described in detail with reference to FIG. 3.

The font predictor 130 generates one or more recommended fonts for the text 104 based on features of the image 102. A method for extracting the features of the image 102 is described in detail with reference to FIG. 2. The font predictor 130 communicates the recommended fonts to the joint-ranking engine 150. The font predictor 130 is described in detail with reference to FIG. 4.

The font predictor 130 uses a machine-learning model to generate a recommended font or fonts. The training data for the font predictor 130 may include designs with the text font in the design identified. A large number of fonts exist and the user device may include fonts that are not found in the training data. Likewise, the training data may include fonts not found on a user device. A mismatch between the fonts used in training and those available on a user device could result in a font recommendation the user device could not implement. A mismatch could also mean that the font predictor 130 is not able to recommend fonts available on the user device if the font is not in the training data.

The font predictor 130 solves these mismatch problems by assigning similarity scores to fonts that are not both available on the user device and in the training data. This allows the font predictor 130 to support fonts available to the user that were not included in the training data. Initially, the user's fonts that are not in the training data are ranked according to their similarity to the recommend fonts (which are in the training data). The visual similarity between two fonts can be evaluated with existing techniques, such as DeepFont. In an aspect, the font predictor 130 assigns a score to each font in the training data. For fonts on the user device that in the training data, the score produced by the font predictor 130 can be the final recommendation score. For fonts available on the user device that are not in the training data, the similarity to each training font is aggregated with the font classification score as a weight for the final font ranking. In this way, the final font ranking is based on similarity to other fonts in the training data. The recommendation score form the most similar fonts are given more weight when the similarity score is used as a weighting factor. The font predictor 130 is described in detail with reference to FIG. 4.

The size predictor 140 generates one or more recommended font sizes for the text 104 based on the image 102. The size predictor 140 communicates the predicted font sizes to the joint-ranking engine 150. The size predictor 140 is described in detail with reference to FIG. 5.

The joint-ranking engine 150 identifies designs to present to the user. As a starting point, potential recommended designs are built using combinations of recommended text property values (i.e., colors, fonts, and sizes) received from the color/font/size predictors. The joint-ranking engine 150 may get the top $n_c$, $n_f$, and $n_s$ recommended colors/fonts/sizes respectively. For example, the size predictor 140 may send the top 10 recommended sizes, the font predictor 130 may send the top 10 recommended fonts, and the color predictor 120 may send the top 10 recommended colors to the joint-ranking engine 150. Embodiments are not limited to using the top 10 recommended colors/fonts/sizes. The joint-ranking engine 150 may use combinations of these text property values to generate $n_c*n_f*n_s$ different design recommendations in total. These design recommendations show the text inserted on the background image at the recommended location. The text in each design recommendation will have a different combination of font color, font size, and font.

The joint-ranking engine 150 may render all these recommended combinations on the background to create a plurality of different images. The joint-ranking engine 150 may evaluate the designs as rendered images. The joint-ranking engine 150 ranks these images (e.g., design recommendations) in terms of the design quality of the added text by jointly considering the effect of all text properties.

In one embodiment, the joint-ranking engine 150 is a convolutional network. The joint-ranking engine 150 may take the image with text rendered in a corresponding style as input, together with a binary mask indicating the bounding box of the added text. The binary mask may place 1 representing pixels where the text was added and 0 in all other locations. The two inputs are stacked together and fed through convolution blocks. The final convolution layer output is converted to a latent feature with global average pooling, and the latent feature is further mapped to a scalar value (e.g. rank) using a linear-sigmoid layer to produce the final ranking score.

The joint-ranking engine 150 may be trained to recognize good and bad designs using training data with good and bad designs labeled. The good designs may be professionally created designs, such as those found in published advertisements. Bad designs may be created by altering the text of good designs. For example, text could be removed from the good design and replaced with text having random characteristics. The training of the joint-ranking engine 150 may proceed in the same way as a Siamese network, where one image with ground truth text style is used as a positive sample and another image with the same background, but randomly perturbated text style is used as a negative example. A small margin between the positive and negative ranking scores is maintained through training.

The designs in the plurality of designs 155 may be those assigned the highest joint ranking by the joint-ranking engine 150. As mentioned, the designs themselves are produced by the joint-ranking engine 150 combining recommended text characteristics and then adding the text on the background image. In one aspect, a visual similarity score is used in combination with rank to select designs for output. The use of a similarity score may add more variety to the recommendations and may prevent a situation where the top five recommended designs only differ by a single characteristic, such as font. The visual similarity score may be a cosine similarity calculated from feature vectors produced from the designs. Other methods of calculating visual similarity are possible.

In an embodiment, a visual similarity between all of the draft designs may be calculated and used to group similar designs. Similar designs may be those with a visual similarity measure within a threshold to each other. Once the similar designs are grouped, the top ranked design from each group may be identified. In one aspect, the top ranked designs (e.g., top five) are selected for output, if each of the top five designs exceeds a threshold value. On the other hand, if one or more of the top five designs does not exceed a threshold value, then other higher ranked designs may be selected from a similarity group with a the top ranked design already selected for output. The plurality of designs may be communicated to the design selection interface 160 for display. In one aspect, the top five designs are included in the plurality of designs 155.

The design selection interface 160 is described with reference to FIG. 6. At a high level, the design selection interface 160 shows a recommended design, but also shows other text characteristics that are highly ranked according to the specialized components responsible for ranking individual characteristics. In one embodiment, the user may select a different characteristic, such as font color, and the design shown in the interface 160 is updated to show the selected color. In another aspect, the highest ranked design, as determined by the joint-ranking engine 150, using the selected color is displayed.

Figure 2:
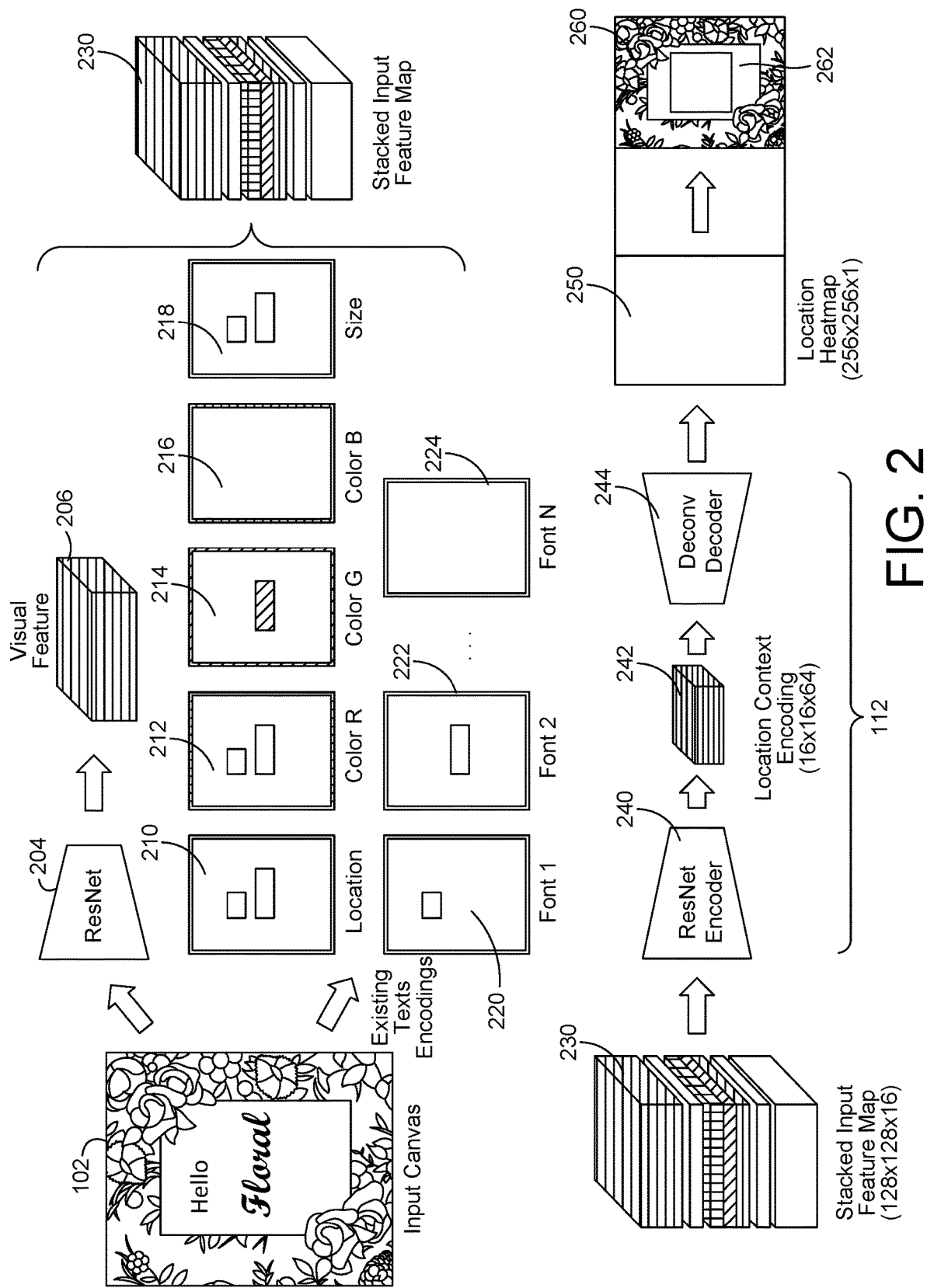
FIG. 2 is an illustration of a location predictor, in accordance with embodiments of the technology described herein.

Turning now to FIG. 2, a location predictor 112 architecture is shown, in accordance with aspects of the technology described herein. The location predictor receives the image 102 as input. The image 102 may include a background design and other text. A feature map 230 is generated from the image 102. The feature map 230 may be described as a stacked input feature map, which includes a plurality of layers representing different image features. The first layer is a visual feature encoding 206 that encodes the image as a whole. The visual feature encoding 206 may be generated using a residual network 204, which is a type of convolutional network having skip connections. A residual Networks (ResNet) ResNet is a Convolutional Neural Network (CNN) architecture, made up of a series of residual blocks (ResBlocks) with skip connections differentiating ResNets from other CNNs. Each ResBlock has two connections from its input, one going through a series of convolutions, batch normalization and linear functions and the other connection skipping over that series of convolutions and functions. These are known as skip connections. The tensor outputs of both connections are added together and then processed by the layer into which the two tensors are being input. Other methods of generating a feature map of the image are possible. The residual network 204 may be a Resnet50 model in one aspect. The residual network 204 may be pre-trained or specifically trained to identify features of interest in a particular design space.

The other layers of the feature map 230 are filter or masking layers. Each layer may be one channel deep, while having the same spatial size as the visual feature encoding 206. The location layer 210 includes a mask over areas of the image where existing text is detected. The existing text may be represented by a bounding box that encompasses the text. The bounding box may be the smallest box that covers every character in a text string. In the location layer 210, the box may be encoded as a "1," while the area where no text (e.g., no box) is present is encoded with a "0."

The color layers (red layer 212, green layer 214, and blue layer 216) include a mask over areas of the image where existing text in the corresponding color is detected. The existing text may be represented by a bounding box that encompasses the text. The bounding box may be the smallest box that covers every character in a text string. In the red layer 212, the box may be encoded the red pixel value, while the area where no text of the corresponding color (e.g., red) is present is encoded with a "0." Each color mask may work in the same way. In this example, the blue layer 216 does not include boxes because no blue is in the existing text of image 102.

The font size layer 218 works in a similar fashion as the location layer 210. The font size of the text represented by the box may be associated with the box as a scalar value. The font 1 layer 202 and the font 2 layer 222 are similar to the font size layer 218, except that the box in each layer is associated with the font corresponding to the text represented by the box. Font N layer 224 illustrates that each text with a different font may be represented on a separate layer. The feature map 230 is formed by combining the visual feature encoding 206 with the other layers (210, 212, 214, 216, 218, 220, 222, and 224).

The feature map 230 is then input to the location predictor 112, which includes a second resnet encoder 240 and deconvolutional decoder 244. A deconvolutional decoder 244 includes deconvolutional layers that result in an upscaling of the location context encoding 242 generated as the output of the second resnet encoder 240 processing the feature map 230.

The output from the deconvolutional decoder 244 is a heat map 250. The heat map 250 predicts the likelihood of a pixel being a candidate text location. The location with the maximum heat map value may be designated as the center of the predicted text-bounding box, whose size is determined by finding the largest rectangular area with average heat map values above a threshold. The rectangular area would encompass the maximum heat map value. The result is a location recommendation image 260 comprising a combination of the image 102 and the location recommendation 262 box delineating the recommended location.

The second resnet encoder 240 and the deconvolutional decoder 244 may be trained with Binary Cross Entropy loss through a process similar to that used with image segmentation. Binary cross entropy is a loss function that is used in binary classification tasks. These are tasks that answer a question with only two choices (yes or no, A or B, 0 or 1, left or right). Formally, this loss is equal to the average of the categorical cross entropy loss on many two-category tasks. Image segmentation is typically used to locate objects and boundaries (lines, curves, etc.) in images. When preparing training data, for each background image associated with one or more text annotations, the technology described herein randomly selects one text box as the target output for the model and uses the remaining text objects as previously added texts. The target output acts as a label indicating where the text should be output. The ground truth prediction for the target output is a binary map with the same size of the canvas, which has value 1 in the rectangular region occupied by the target text (e.g., target output) and 0 otherwise. The remaining text objects are used to construct the input feature maps for the training images, as described above. In other words, the training images are also used to build a feature map during the training process.

Figure 3:
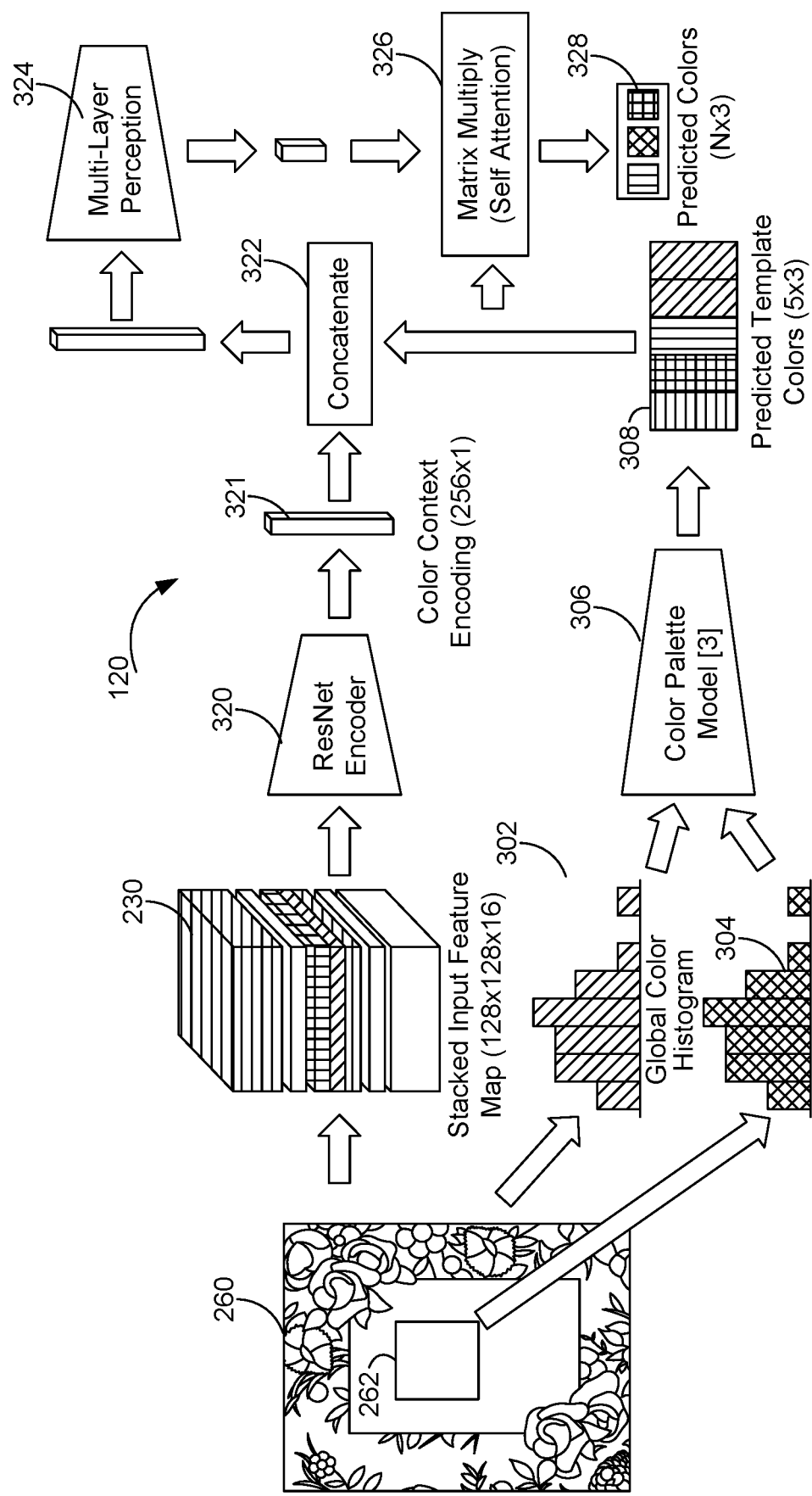
FIG. 3 is an illustration of a color predictor, in accordance with embodiments of the technology described herein.

Turning now to FIG. 3, a color predictor 120 architecture is shown, in accordance with aspects of the technology described herein. The color predictor 120 receives the feature map 230 as input. The feature map 230 has been described previously, but in brief, it represents features of the background design in the image 102 and any existing text on the image 102.

The color predictor 120 has a large output space (255^3 possible values). To reduce the difficulty of model learning, color predictor 120 exploits color palette domain knowledge to regularize the final color prediction. Based on domain knowledge, the predicted text color should keep sufficient brightness contrast with its local background. This prevents the recommended text color from being indistinguishable from the background color at the recommended location 262. The predicted text color should also be similar to or compatible with the dominant colors in the entire background image.

To implement the domain knowledge, a HSV global color histogram 302 and a local color histogram 304 are extracted from the global and local background images. The local background corresponds to the background image color at the recommended location 262. The color palette model 306 takes as input the global and local HSV color histograms, and outputs a stacked array of HSV values 308 that are both aesthetic and accessible (as in having enough contrast with respect to the background for enhanced readability). The color palette model 306 may include seven different models, each corresponding to a color harmonic template (monochromatic, analogous, complementary, triad, single split, double split, and square).

In order to train the color palette model 306, for each text in the training set, the harmonic relationship between the global HSV histogram and the text color in the training instance is determined. The training data is then separated into seven different sets (one per harmonic class), and the seven models are individually trained for each class to predict the color palette for recommended color hues. This helps each model better learn to predict colors according to its harmonic template. Otherwise, a given text color may not be accurately explained by the global HSV histogram alone, and a global model could learn to produce average dull colors instead.

Harmonic templates describe mostly hue relationships between colors. Text saturation and lightness are independent from the harmonic class and can be learned directly from the HSV histograms. Hence, the accessible part of the recommended colors is directly regularized by enforcing sufficient difference of color lightness and sufficient similarity of color saturation between the average of the local HSV (Hue/saturation/value) histogram and the recommended colors.

The color predictor 120 includes a third resnet encoder 320 that receives the feature map and generates a color context encoding 321. The color context encoding 321 it concatenated with the HSV values 308 and input to a multi-layer perceptron network 324. In one aspect, the multi-layer perceptron network 324 is a two-layer MLP. The color predictor 120 uses a global average pooling layer to convert the last convolutional layer response to a latent vector, which is further fed into a self-attention layer 326 together with the stacked array of HSV values 308 from the predicted color palette. The self-attention output 328 is used as the weights associated with the colors in the palette. The top N predicted classes are used in the recommended color palette.

To train the color predictor 120, the color closest in the color palette to the ground truth of the text in the training image is assigned as the target prediction. As the color predictor 120 and the color palette model 306 are trained together, the difference between the ground truth color and the top-ranked color in the palette is minimized. Instead of doing direct color value regression, a classification loss may be used to train the model. To create the virtual classes, the range of each HSV channel may be quantized into discrete bins. The loss on each color channel may be calculated independently with cross entropy function. The training data includes designs with labeled existing text.

Figure 4:
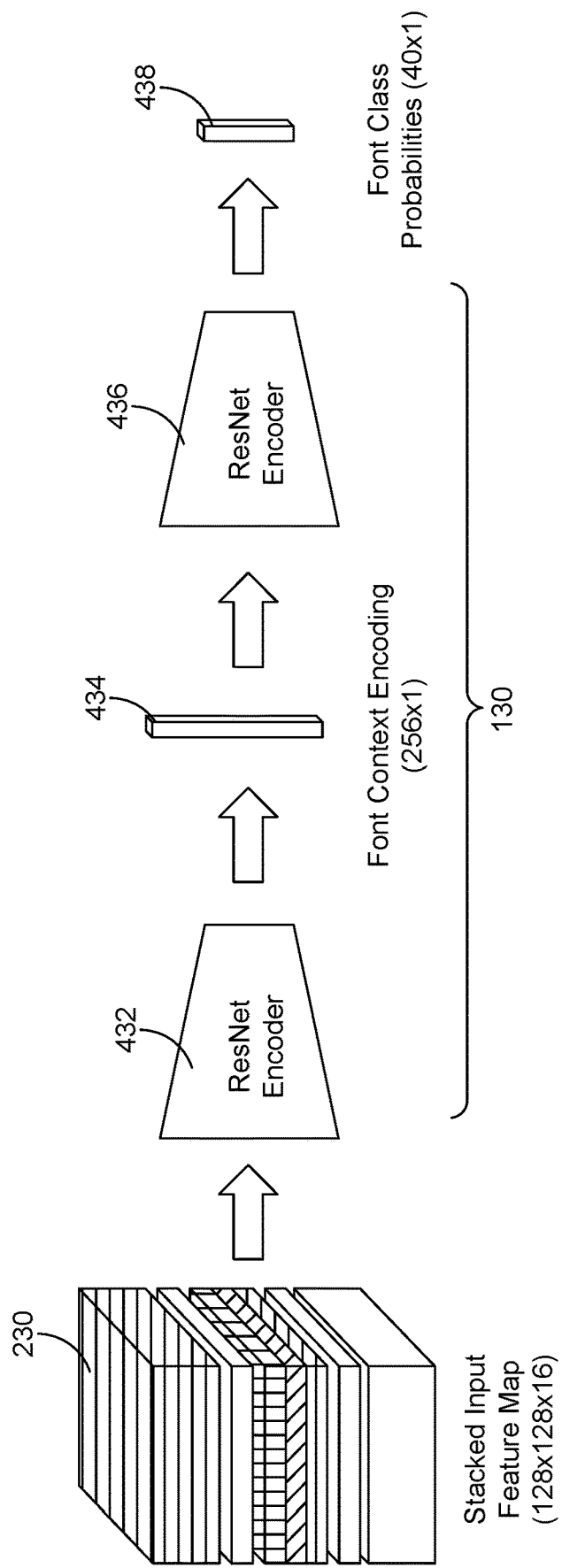
FIG. 4 is an illustration of a font predictor, in accordance with embodiments of the technology described herein.

Turning now to FIG. 4, a font predictor 130 architecture is shown, in accordance with aspects of the technology described herein. The font predictor 130 receives the feature map 230 as input. The feature map 230 has been described previously, but in brief, it represents features of the background in the image 102 and any existing text on the image 102. The font predictor 130 includes a fourth resnet encoder 432 and a linear classifier 436. The linear classifier 436 may include a single softmax layer. The feature map 230 is input to the fourth resnet encoder 432, which generates a font context encoding 434. The font context encoding 434 may be a latent vector generated by converting a response of the last convolutional layer in the fourth resnet encoder 432 using global average pooling. The linear classifier 436 generates font class probabilities 438 from the context encoding. The font classes with the highest probabilities may be the recommended font classes. Each class may correspond to a font in the training data. The model may be trained with both cross entropy classification loss and similarity-based ranking loss. The training data includes designs with labeled existing text. The label identifies the font.

The recommended fonts may be limited to those available to the user on a particular device. The training fonts used to train the font predictor 130 may include fonts not available on the device. In this case, the system may rank all the user's fonts according to their similarity to the predicted font classes. The visual similarity between two fonts can be evaluated with existing techniques, such as DeepFont. The similarity to each training class is aggregated with the classification score as a weight for final ranking. Thus, the ranking score for a font not in the training data could be similarity score times the raw class score for the font. The training data can include a design with text removed and a training label corresponding the font size of the removed text.

Figure 5:
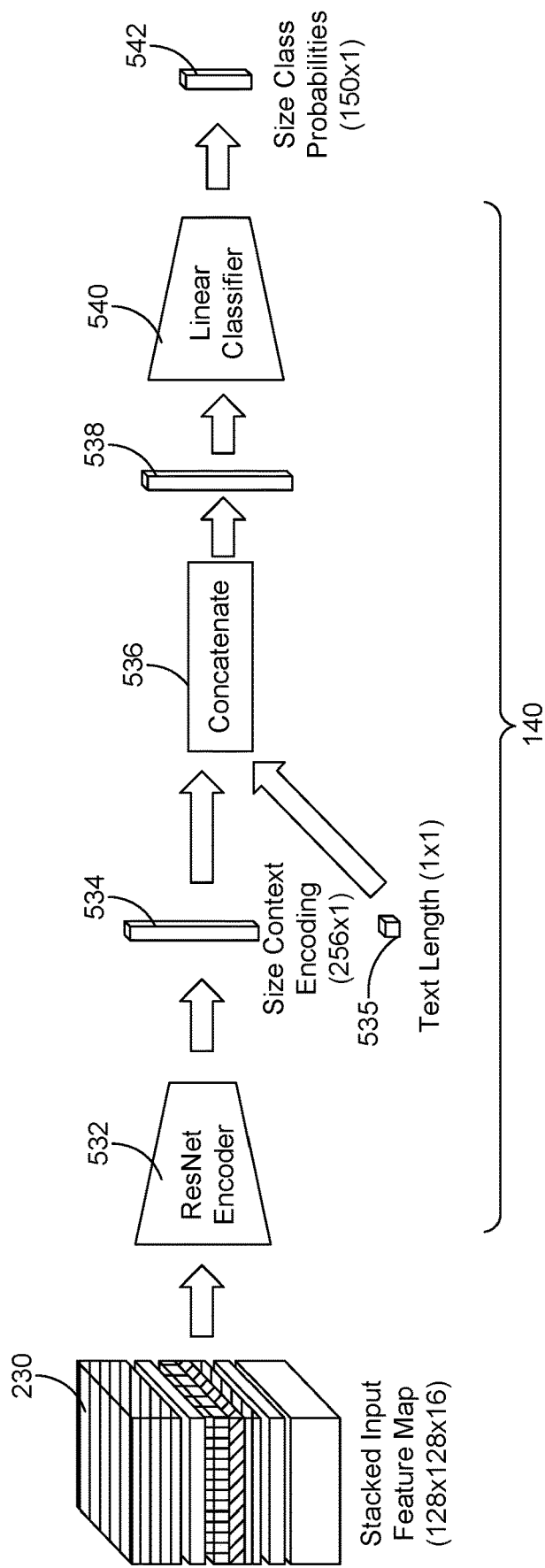
FIG. 5 is an illustration of a font size predictor, in accordance with embodiments of the technology described herein.

Turning now to FIG. 5, a font size predictor 140 architecture is shown, in accordance with aspects of the technology described herein. The font size predictor 140 receives the feature map 230 as input. The font size predictor 140 also receives the text length 535 as an input. The text length may be the number of characters in input text 104. Other measures of text length may be used, such as lines. The feature map 230 has been described previously, but in brief, it represents features of the image 102, including any existing text on the image 102. The font size predictor 140 includes a fifth resnet encoder 532 and a linear classifier 540. The fifth resnet encoder 532 receives the feature map 230 as input and generates a size context encoding 534. The size context encoding 534 is concatenated 536 with the text length of the input text 104 to form a concatenated encoding 538, which is the result of a globally pooled convolutional layer response of the last convolutional layer in the fifth resnet encoder 532. There is an inverse relationship between text size and text length. In other words, the longer the text then the smaller the font size needed to fit the text into the recommended location 262 box.

The concatenated encoding is input to the linear classifier 540, which may be a softmax layer. The output of the linear classifier 540 is a plurality of size class probabilities. Each size is associated with a corresponding probability. In aspects, the sizes are limited to values between 1 pixel and 150 pixels. The font size may be the pixel height of a font's capital letters. Cross entropy classification loss may be used to train the font size predictor for 150 font size classes or some other desired amount of classes. The training data can include a design with text removed and a training label corresponding the font of the removed text.

There is usually more than one good design choice for each text property, and different plausible design values could be very different. The diversity in design recommendation is also favored by users for easier personalization. In other words, it does not help the user to receive five similar designs. Providing different designs gives the user more actual choices. However, design documents collected in the wild are usually dominated by a few common styles. For example, there are way more white and black texts than those in other colors. If the system simply trains on such an unbalanced dataset, most models will degenerate to only predicting the most popular design choices.

To fix this issue, the technology described herein first multiplies a weight to each training sample's loss, and the weight is inversely proportional to the frequency of the sample's label within the training set. In this way, the model gives more attention to those less common colors, fonts, and font sizes. In addition, for each model, the technology described herein may attach multiple parallel classification layers to the backbone convolution feature, and take the minimum of all the classification losses as the final loss. In this way, the system only requires only one classification output to match ground truth, while allowing other classification outputs to account for more design variations.

Figure 6:
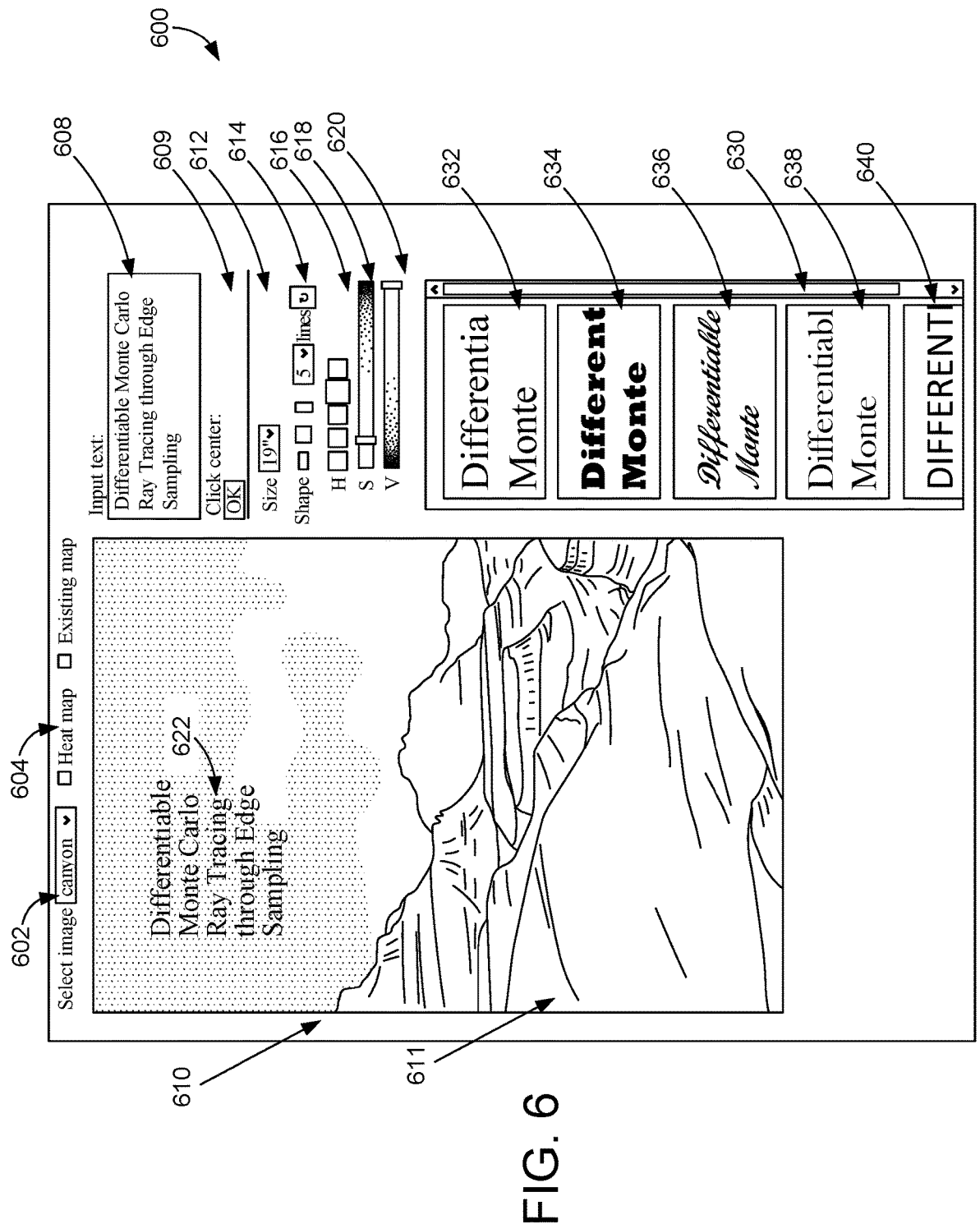
FIG. 6 is an illustration of a textual design interface, in accordance with embodiments of the technology described herein.

Turning now to FIG. 6, textual design interface 600 is shown, in accordance with aspects of the technology described herein. The textual design interface 600 allows the user to start a project by selecting a background image and text to be added the background image. The textual design interface 600 then shows the text 622 added to the image in accordance with a textual design generated by the textual design agent 110, thereby forming a draft design 611. The textual design includes a location for the text, text color, text font, and text size. Various controls on the textual design interface 600 allow the user to adjust characteristics of the design or select different recommended designs. As the characteristics are changed, the appearance of the text within the canvas is updated.

To start a project, a user first selects a background image through the image selection interface 602. Once selected, the image may appear on the canvas 610. The example image shown on the canvas 610 depicts a canyon on a cloudy day. The image selection interface 602 may allow the user to navigate to a local or cloud-based storage location in order to select an image. Though not shown, the image selection interface 602 may provide filters to help the user find the desired image. Example filter characteristics include file author, creation date, edit date, file type, and the like. The image selection interface 602 may also include a search function that allows the user to search for images with a query, possibly in combination with one or more filter characteristics.

The heat map selection 604 interface causes a location heat map to be shown in the canvas 610 instead of, or in addition to, the selected image. The heat map may be shown with the image by displaying a translucent version of the heat map on top of the image. The heat map may be generated by the location predictor 112. As mentioned, the location predictor 112 generates a heat map representing predictive locations for the text to be inserted onto the image. The location predictor 112 may anchor a bounding box at a center point of the highest intensity pixel within the heat map. Exposing the heat map allows the user to consider other locations for the text based on the heat map. Other locations of interest may include high-intensity areas that do not include the highest intensity pixel.

The text box 608 receives text from the user. The user may compose text within the text box 608 or paste text into the text box 608. The textual design agent 110 then generates a recommended textual design for the text. Optionally, a rough initial desired position for the text can be provided by clicking on the canvas.

After the text and images are received, the textual design agent 110 will return a list of ranked design recommendations for the current text, and display them in the thumbnails (632, 634, 636, 638, and 640) in the bottom-right preview side bar. The top ranked design 611 is also displayed on the canvas 610 and set the default values in the text property panel 609.

The user can modify the design to their own taste by selecting a different size, color and font. The size can be set from a dropdown list 612. The font can be selected from the preview side bar. The color options are decomposed into HSV channels, where the hue channel 616 presents a few recommended options to choose from, and the saturation channel 618 and value channel 620 are controlled by sliders for more fine-grained adjustment. The position of the text can be adjusted by mouse dragging. The layout (number of lines) can also be chosen from a few provided options through the line section interface 614. Overall, the interface 600 allows the user to navigate through different text styles while offering a moderate level of parameter control.

After finishing the design of one text, the user can add another text by repeating the process. If the user is not satisfied, the canvas can be reset by clearing all the added texts. The final design work may be downloaded from the canvas to a storage location, service, or application.

Exemplary Methods

Figure 7:
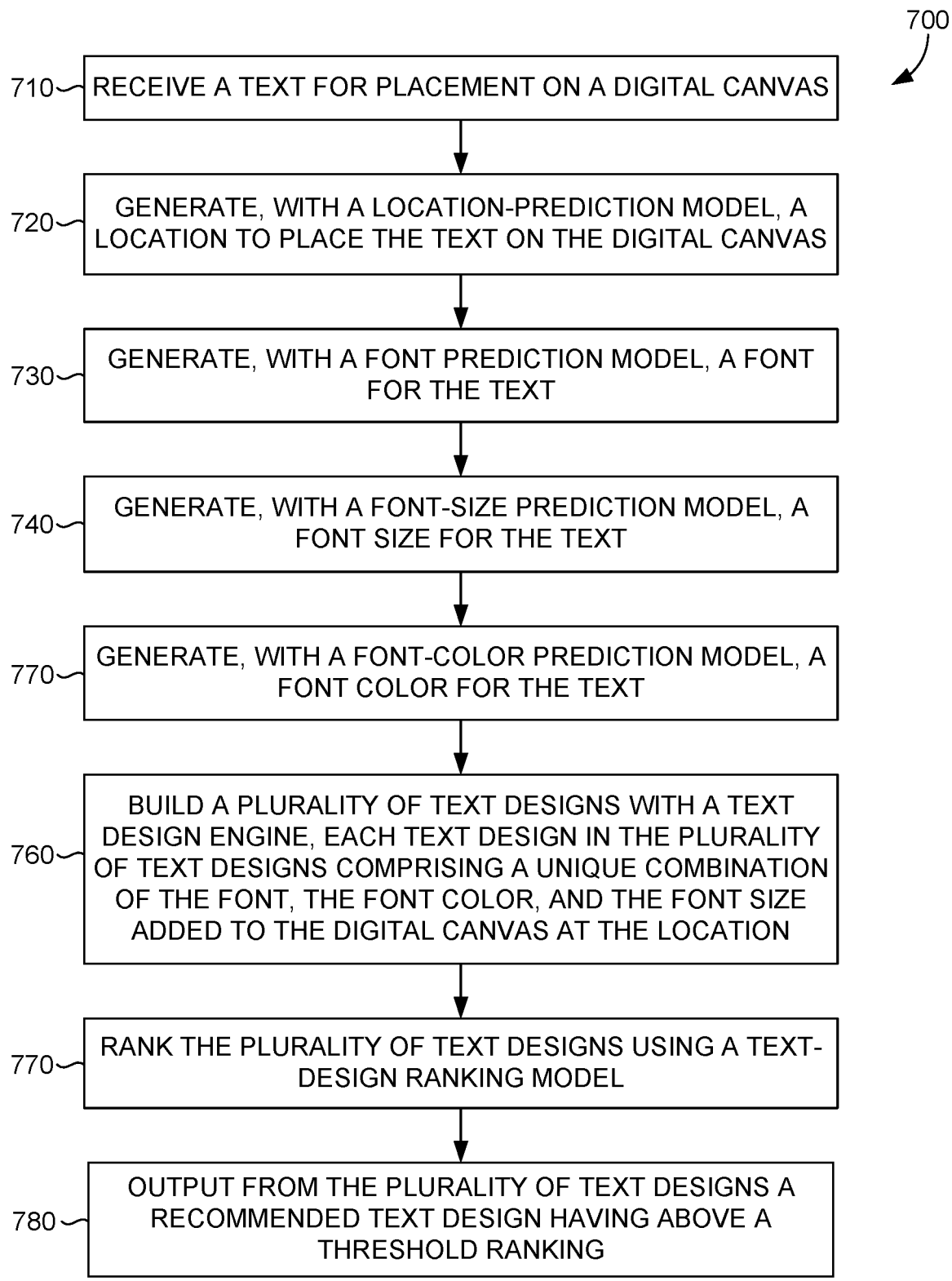
FIG. 7 provides a first example method of generating a textual design, in accordance with embodiments of the technology described herein.
Figure 8:
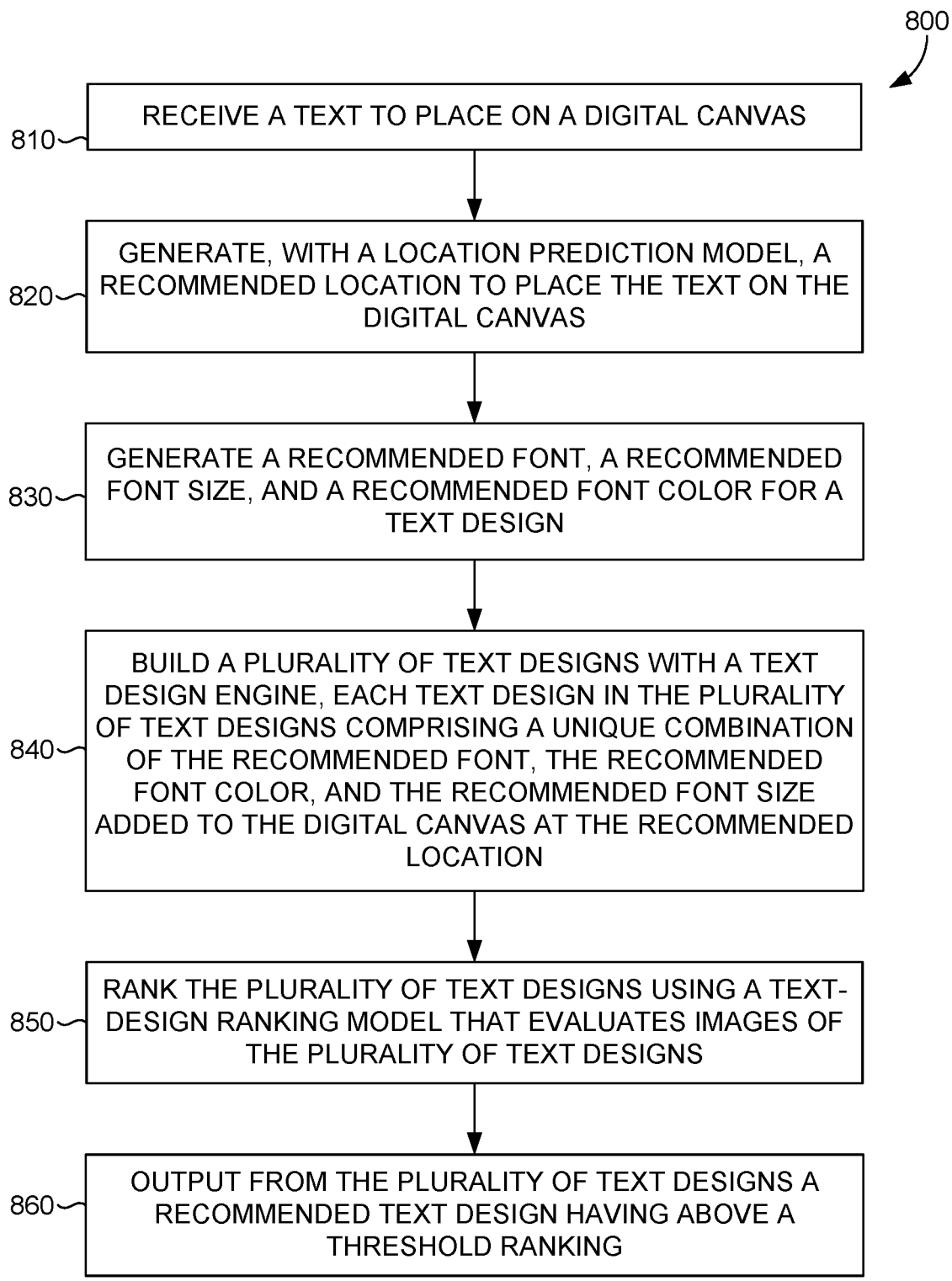
FIG. 8 provides a second example method of generating a textual design, in accordance with embodiments of the technology described herein.
Figure 9:
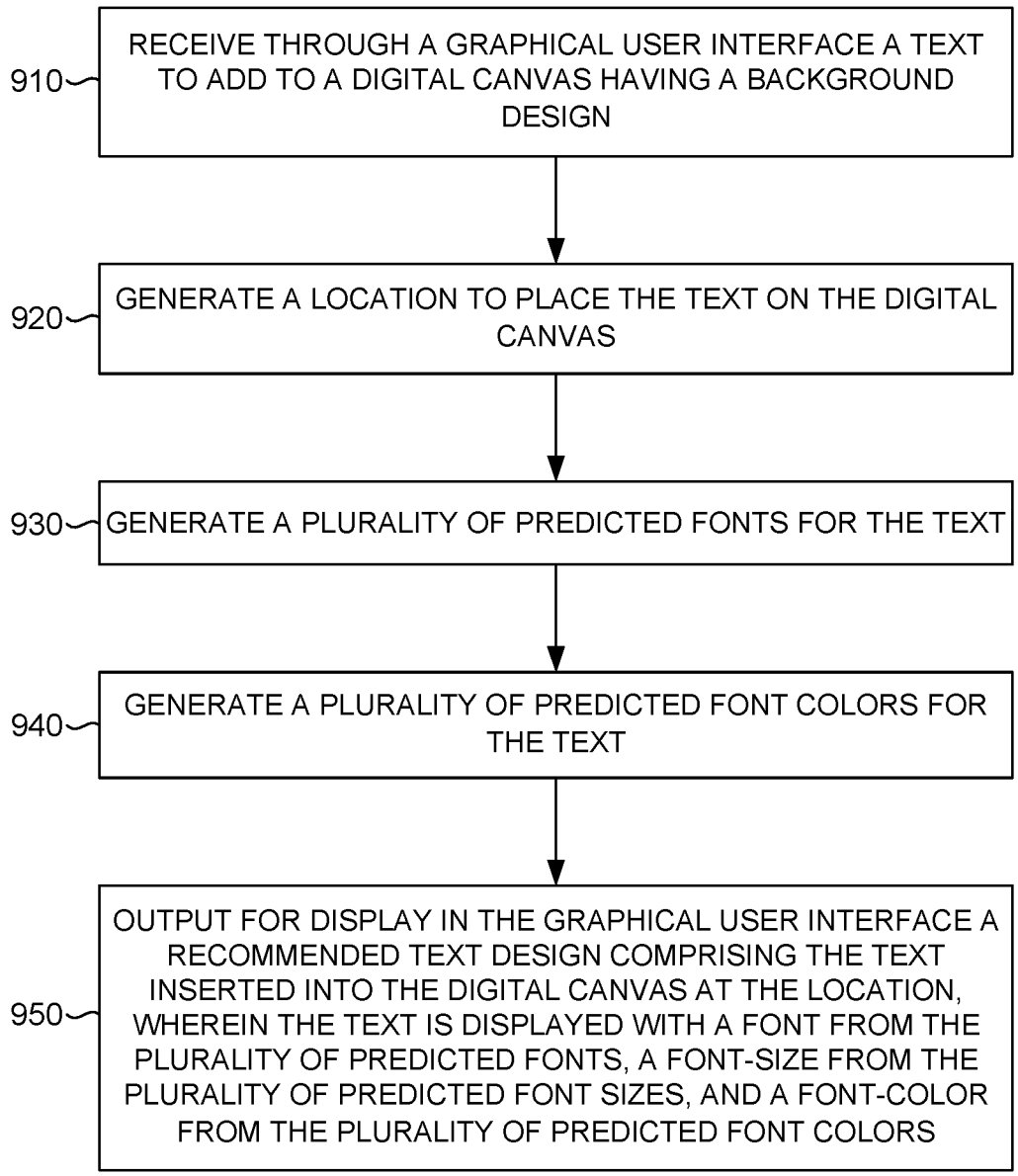
FIG. 9 provides a third example method of generating a textual design, in accordance with embodiments of the technology described herein.

Now referring to FIGS. 7-9, each block of methods 700, 800, and 900, described herein, includes a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), or a plug-in to another product, to name a few. In addition, methods 700, 800, and 900 are described, by way of example, with respect to the design agent 110 of FIG. 1 and additional features of FIGS. 2-6. However, these methods may additionally or alternatively be executed by any one system, or any combination of systems, including, but not limited to, those described herein.

FIG. 7 is a flow diagram showing a method 700 for generating a textual design, in accordance with some embodiments of the present disclosure. The method 700, at block 710 includes receiving a text for placement on a digital canvas.

The method 700, at block 720 includes generating, with a location-prediction model, a location to place the text on the digital canvas. The method 700, at block 730 includes generating, with a font prediction model, a font for the text. The method 700, at block 740 includes generating, with a font-size prediction model, a font size for the text. The method 700, at block 750 includes generating, with a font-color prediction model, a font color for the text. The method 700, at block 760 includes building a plurality of text designs with a text design engine, each text design in the plurality of text designs comprising a unique combination of the font, the font color, and the font size added to the digital canvas at the location. The method 700, at block 770 includes ranking the plurality of text designs using a text-design ranking model. The method 700, at block 780 includes outputting from the plurality of text designs a recommended text design having above a threshold ranking.

FIG. 8 is a flow diagram showing a method 800 for generating a textual design, in accordance with some embodiments of the present disclosure. The method 800, at block 810, includes receiving a text for placement on a digital canvas. The method 800, at block 820, includes generating, with a location prediction model, a recommended location to place the text on the digital canvas. The method 800, at block 830, includes generating a recommended font, a recommended font size, and a recommended font color for a text design.

The method 800, at block 840, includes building a plurality of text designs with a text design engine, each text design in the plurality of text designs comprising a unique combination of the recommended font, the recommended font color, and the recommended font size added to the digital canvas at the recommended location. The method 800, at block 850, includes ranking the plurality of text designs using a text-design ranking model that evaluates images of the plurality of text designs. The method 800, at block 860, includes outputting from the plurality of text designs a recommended text design having above a threshold ranking.

FIG. 9 is a flow diagram showing a method 900 for generating a textual design, in accordance with some embodiments of the present disclosure. The method 900, at block 910, includes receiving through a graphical user interface a text to add to a digital canvas having a background design.

The method 900, at block 920, includes generating a location to place the text on the digital canvas. The method 900, at block 930, includes generating a plurality of predicted fonts for the text. The method 900, at block 940, includes generating a plurality of predicted font sizes for the text. The method 900, at block 950, includes generating a plurality of predicted font colors for the text. The method 900, at block 960, includes outputting for display in the graphical user interface a recommended text design comprising the text inserted into the digital canvas at the location, wherein the text is displayed with a font from the plurality of predicted fonts, a font-size from the plurality of predicted font sizes, and a font-color from the plurality of predicted font colors.

Exemplary Operating Environment

Figure 10:
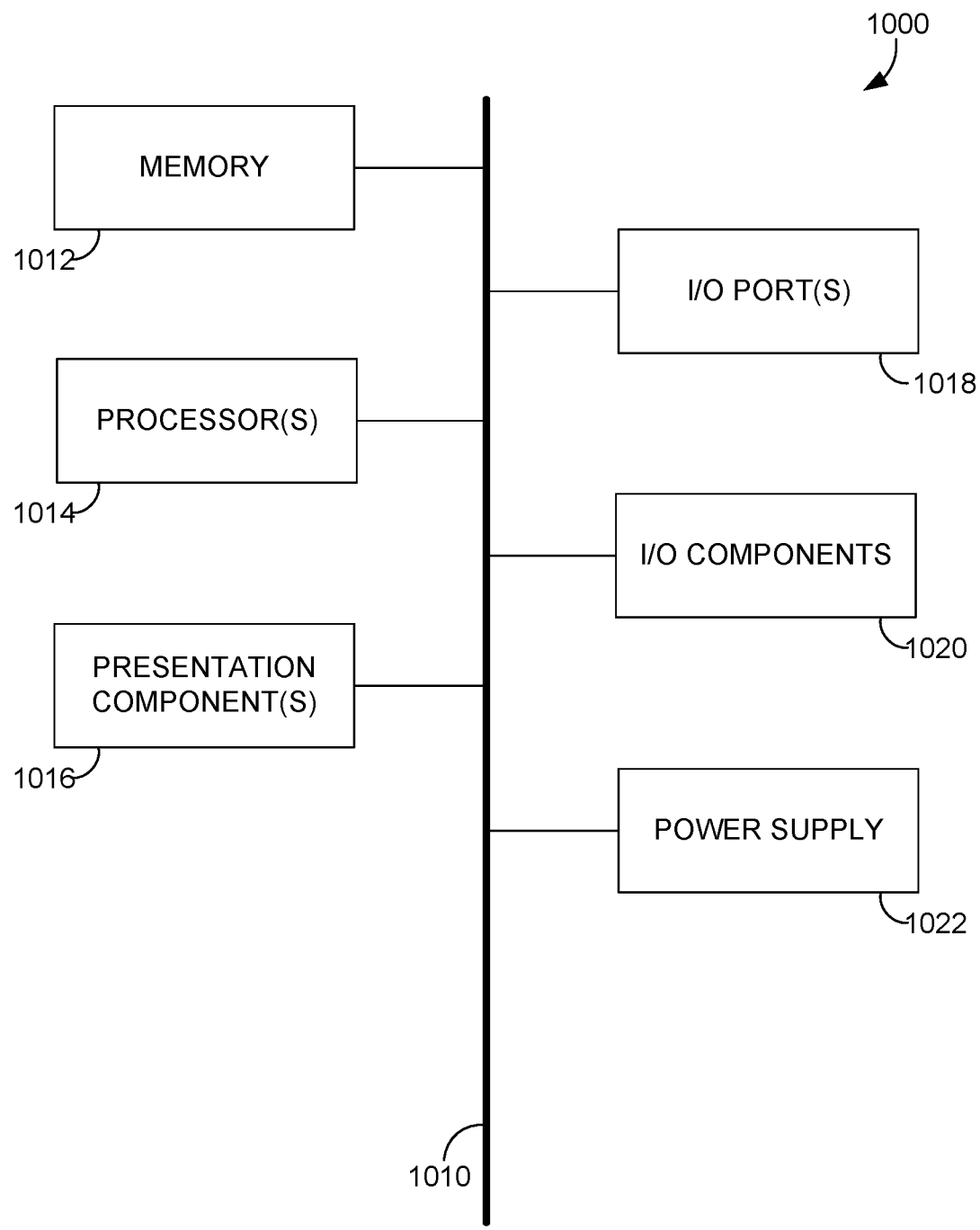
FIG. 10 is a block diagram of an example computing environment suitable for use in implementing embodiments of the technology described herein.

Having briefly described an overview of embodiments of the present invention, an example operating environment in which embodiments of the present invention may be implemented is described below in order to provide a general context for various embodiments of the present invention. Referring initially to FIG. 10 in particular, an example operating environment for implementing embodiments of the present invention is shown and designated generally as computing device 1000. Computing device 1000 is but one example of a suitable computing environment and is not intended to suggest any limitation as to the scope of use or functionality of the invention. Neither should computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes bus 1010 that directly or indirectly couples the following devices: memory 1012, one or more processors 1014, one or more presentation components 1016, input/output ports 1018, input/output components 1020, and illustrative power supply 1022. Bus 1010 represents what may be one or more buses (such as an address bus, data bus, or combination thereof). The various blocks of FIG. 10 are shown with lines for the sake of conceptual clarity, and other arrangements of the described components and/or component functionality are contemplated. For example, one may consider a presentation component such as a display device to be an I/O component. In addition, processors have memory. We recognize that such is the nature of the art, and reiterate that the diagram of FIG. 10 is merely illustrative of an example computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may include computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

The technical solution system can further include a machine-learning system. A machine-learning system may include machine-learning tools and training components. Machine-learning systems can include machine-learning tools that are utilized to perform operations in different types of technology fields. Machine-learning systems can include pre-trained machine-learning tools that can further be trained for a particular task or technological field. At a high level, machine learning is a field of study that gives computers the ability to learn without being explicitly programmed. Machine learning explores the study and construction of machine-learning tools, including machine-learning algorithm or models, which may learn from existing data and make predictions about new data. Such machine-learning tools operate by building a model from example training data in order to make data-driven predictions or decisions expressed as outputs or assessments. Although example embodiments are presented with respect to a few machine-learning tools, the principles presented herein may be applied to other machine-learning tools. It is contemplated that different machine-learning tools may be used, for example, Logistic Regression (LR), Naive-Bayes, Random Forest (RF), neural networks (NN), matrix factorization, and Support Vector Machines (SVM) tools may be used for addressing problems in different technological fields.

In general, there are two types of problems in machine-learning: classification problems and regression problems. Classification problems, also referred to as categorization problems, aim at classifying items into one of several category values (for example, is this email SPAM or not SPAM). Regression algorithms aim at quantifying some items (for example, by providing a value that is a real number). Machine-learning algorithms can provide a score (e.g., a number from 1 to 100) to qualify one or more products as a match for a user of the online marketplace. It is contemplated that cluster analysis or clustering can be performed as part of classification, where clustering refers to the task of grouping a set of objects in such a way that objects in the same group (called a cluster) are more similar (in some sense) to each other than to those in other groups (clusters). It is a main task of exploratory data mining, and a common technique for statistical data analysis, used in many fields, including pattern recognition, image analysis, information retrieval, bioinformatics, data compression, computer graphics and machine learning.

Machine-learning algorithms utilize the training data to find correlations among identified features (or combinations of features) that affect an outcome. A trained machine-learning model may be implemented to perform a machine-learning operation based on a combination of features. An administrator of a machine-learning system may also determine which of the various combinations of features are relevant (e.g., lead to desired results), and which ones are not. The combinations of features determined to be (e.g., classified as) successful are input into a machine-learning algorithm for the machine-learning algorithm to learn which combinations of features (also referred to as "patterns") are "relevant" and which patterns are "irrelevant." The machine-learning algorithms utilize features for analyzing the data to generate an output or an assessment. A feature can be an individual measurable property of a phenomenon being observed. The concept of feature is related to that of an explanatory variable used in statistical techniques such as linear regression. Choosing informative, discriminating, and independent features is important for effective operation of the machine-learning system in pattern recognition, classification, and regression. Features may be of different types, such as numeric, strings, and graphs.

The machine-learning algorithms utilize the training data to find correlations among the identified features that affect the outcome or assessment. The training data includes known data for one or more identified features and one or more outcomes. With the training data and the identified features the machine-learning tool is trained. The machine-learning tool determines the relevance of the features as they correlate to the training data. The result of the training is the trained machine-learning model. When the machine-learning model is used to perform an assessment, new data is provided as an input to the trained machine-learning model, and the machine-learning model generates the assessment as output.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments that are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for generating a textual design, the method comprising:

receiving a text for placement on a digital canvas having a background image;

generating a stacked input feature map of the background image using a neural network, wherein the stacked input feature map includes a plurality of layers representing different image features, wherein at least one of the plurality of layers is a masking layer;

generating, with a location-prediction model, a location to place the text on the digital canvas, wherein the stacked input feature map is an input to the location-prediction model;

generating, with a font prediction model, a font for the text, wherein the stacked input feature map is an input to the font-prediction model;

generating, with a font-size prediction model, a font size for the text, wherein the location is an input to the font-size prediction model;

generating, with a font-color prediction model, a font color for the text;

building a plurality of text designs with a text design engine, each text design in the plurality of text designs comprising a unique combination of the font, the font color, and the font size added to the digital canvas at the location;

ranking the plurality of text designs using a text-design ranking model; and outputting from the plurality of text designs a recommended text design having above a threshold ranking.

2. The method of claim 1, wherein the stacked input feature map and the location are used to form inputs to the font-size prediction model and the font-color prediction model.

3. The method of claim 1, wherein the location model outputs a heat map, and wherein the location is a bounding box with a center at a maximum heat map value.

4. The method of claim 3, wherein a size of the bounding box is selected to overlap an area of the heat map with above a threshold heat map value.

5. The method of claim 1, wherein the method further comprises generating a plurality of color recommendations with a color palate model that takes as input a local color histogram derived from colors of the digital canvas.

6. The method of claim 5, wherein the color palate model comprises a plurality of different models each trained on data sets belonging to a separate color harmonic template.

7. The method of claim 1, wherein the font-size prediction model is a multi-class classifier with each class corresponding to a specific font size.

8. One or more computer-storage media having computer-executable instructions embodied thereon that, when executed by a computing system having a processor and memory, cause the computing system to perform a method of generating a textual design, the method comprising:

receiving a text to place on a digital canvas having a background image;

generating a stacked input feature map of the background image using a neural network, wherein the stacked input feature map includes a plurality of layers representing different image features, wherein at least one of the plurality of layers is a masking layer;

generating, with a location prediction model, a recommended location to place the text on the digital canvas, wherein the stacked input feature map is an input to the location-prediction model;

generating a recommended font, a recommended font size, and a recommended font color for a text design, wherein the recommended location is used as input to generate the recommended font and the recommended font size;

building a plurality of text designs with a text design engine, each text design in the plurality of text designs comprising a unique combination of the recommended font, the recommended font color, and the recommended font size added to the digital canvas at the recommended location;

ranking the plurality of text designs using a text-design ranking model that evaluates images of the plurality of text designs; and outputting from the plurality of text designs a recommended text design having above a threshold ranking.

9. The media of claim 8, wherein the method further comprises inputting the recommended location to the text-design ranking model.

10. The media of claim 8, wherein the text-design ranking model is trained as a Siamese model with positive and negative examples.

11. The media of claim 10, wherein the negative examples comprise a common background and training text as used in corresponding positive examples, and wherein a training text design for the training text in the negative example comprises a randomly selected combination of characteristics.

12. The media of claim 8, wherein the recommended location is used as an input to generate the recommended font color.

13. The media of claim 8, wherein the text-design ranking model is a convolutional neural network.

14. The media of claim 8, wherein the method further comprises:

receiving an instruction to adopt the recommended text design thereby creating an updated digital canvas; and receiving a second text to add to the updated digital canvas.

15. The method of claim 14, wherein the method further comprises generating updated text design recommendations for inserting the second text on the updated digital canvas.

16. A method of generating a textual design comprising:

receiving through a graphical user interface a text to add to a digital canvas having a background design;

generating a stacked input feature map of the background design using a neural network, wherein the stacked input feature map includes a plurality of layers representing different image features, wherein at least one of the plurality of layers is a masking layer;

generating, with a location prediction model, a location to place the text on the digital canvas, wherein the stacked input feature map is an input to the location-prediction model;

generating, with a font prediction model, a plurality of predicted fonts for the text, wherein the location is an input to the font prediction model;

generating, with a font-size prediction model, a plurality of predicted font sizes for the text, wherein the location is an input to the font-size prediction model;

generating, with a font-color prediction model, a plurality of predicted font colors for the text, wherein the location is an input to the font-color prediction model; and outputting for display in the graphical user interface a recommended text design comprising the text inserted into the digital canvas at the location, wherein the text is displayed with a font from the plurality of predicted fonts, a font-size from the plurality of predicted font sizes, and a font-color from the plurality of predicted font colors.

17. The method of claim 16, wherein the graphical user interface comprises a font selection interface providing a first amount of fonts from the plurality of predicted fonts for selection, a font-size selection interface providing a second amount of font sizes from the plurality of predicted font sizes for selection, and a font-color selection interface providing a third amount of font colors from the plurality of predicted font colors for selection.

18. The method of claim 17, wherein the graphical user interface comprises a design preview section showing thumbnails of alternative text designs comprising different combinations of fonts, font sizes, and font colors from a combination used in the recommended text design.

19. The method of claim 16, further comprising receiving an instruction to adopt the recommended text design being displayed thereby creating an updated digital canvas and receiving a second text to add to the updated digital canvas.

20. The method of claim 16, further comprising receiving a suggested location for the text, wherein the location is a bounding box centered at a point nearest to the suggested location and having above a designated heat measure on a heat map generated by a location prediction model.

\* \* \* \* \*